United States Patent Office 3,545,941
Patented Dec. 8, 1970

3,545,941
SETTLING OF HEMATITE SLIMES
Martin Wilson, Anaheim, Calif., assignor to United States Borax & Chemical Corporation, Los Angeles, Calif., a corporation of Nevada
Continuation-in-part of application Ser. No. 603,860, Dec. 22, 1966. This application Mar. 19, 1969, Ser. No. 808,624
Int. Cl. B01d 11/02, 21/01; C01d 3/14
U.S. Cl. 23—312
21 Claims

ABSTRACT OF THE DISCLOSURE

Pinkness contributed to potash brines by hematite slime is eliminated by adding clarifying amounts of dispersed clay, $C_{14}+$ primary alklyamines, or mixtures thereof before addition of flocculants to the brine.

RELATED APPLICATIONS

Figure 1:
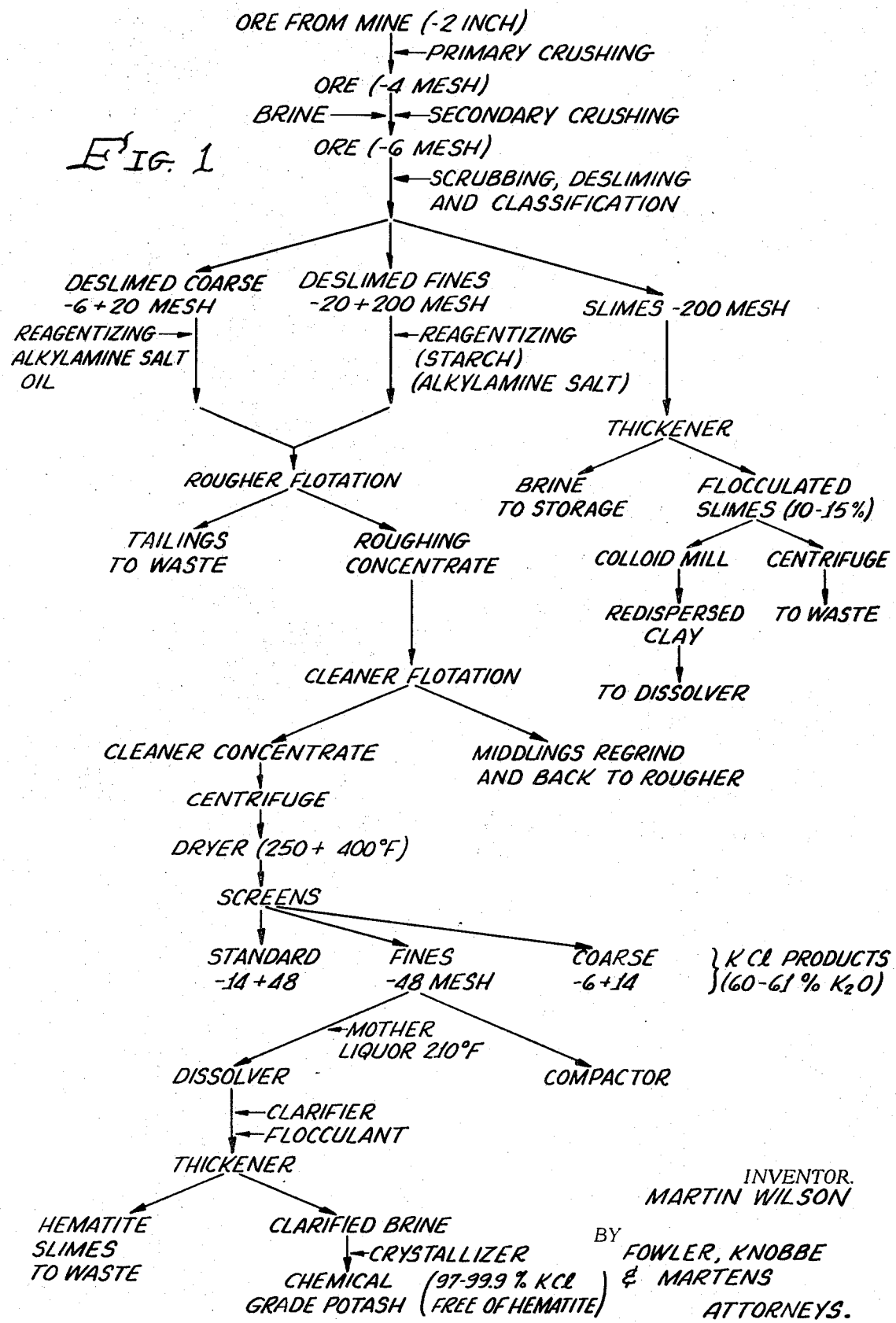

This application is a continuation-in-part of copending application Ser. No. 603,860, filed Dec. 22, 1966 entitled Settling of Hematite Slimes, now abandoned.

Froth flotation processing and refining of potash ores utilizes the principles of flotation to separate soluble materials. Sylvinite ($x$NaCl·KCl) ores when comminuted release halite (NaCl) and sylvite (KCl) crystals. Sylvite with a specific gravity of 1.98 and halite with a specific gravity of 2.2 can be separated by suitable choice of size reduction and flotation reagent. Usually the ore is reduced to —6 mesh on the Tyler scale and is treated with a flotation reagent which selectively coats the sylvite particles. The particles are suspended in a saturated brine in a flotation cell and on injection of air into the slurry, bubbles attach to the coated sylvite, i.e., potash particles and float them to the surface.

Potash (KCl) released in the form of a flotation concentrate, is not sufficiently pure for a chemical grade product. The concentrate must be dissolved in brine and recrystallized to the desired purity.

Most Canadian potash ores such as Allan contain sylvinite and between 2 to 6 percent water insolubles. Part of the water insolubles comprises about 1 to 5 pounds of the red mineral hematite ($Fe_2O_3$) per ton of ore closely associated with the KCl crystals amounting to about 0.1 percent to 0.5 percent by weight of the basis of the KCl. The hematite remains with the potash particles throughout the initial sizing, washing, and flotation operations. When the flotation concentrate is redissolved for recrystallization in hot mother liquor, the hematite is released as a red slime which circulates with the heat currents. Quite often in plant practice the addition of flocculants does not settle all of the hematite and a pinkish cast persists in the brine which flows to the crystallizer. The crystallized pink product is not marketable as high quality, chemical grade potash.

It has been discovered that the periodic absence of pink potash brines is due to materials present during processing that contribute to clarification of the brines and this invention relates to hematite clarification of potash brine solutions by addition of clarifiers to the brine in certain specified ranges to assure that the flocculation agent settles and removes all the red hematite from the brine.

In one aspect, the invention is based on the discovery that the occasional preservation of the flotation reagent during processing between flotation concentrate separation and solution crystallization contributes to hematite slime clarification. It has further been determined that only certain of these reagents are beneficial in this respect and only when utilized in certain minimum clarifying amounts.

The invention embodies the further discovery that the difficult to settle hematite slime may be removed from potash brine solutions by adding a clarifying amount of dispersed clay, an alkylamine flotation agent, or a mixture of dispersed clay and select flotation agents to the hot brine. Furthermore, the clay and flotation agents can advantageously be by-products of the ore benefication.

Briefly, the inventive method of producing clear potash brines from hematite contaminated potash particles comprises dissolving the particles to form a hot solution of potash containing a suspension of hematite slime, adding a clarifying amount of a primary alkyl amine containing at least 14 carbon atoms or of a dispersion of clay or of a mixture of the amine and clay to the concentrate, then settling the slime by adding a flocculant to the hot solution and recovering a clear potash brine.

Exceptionally good results have been obtained with anionic flocculants.

One feature of the process of this invention is that a clear brine potash liquid can be obtained which is free of hematite.

Another feature is that by-products of the process can be recirculated into the process at a later treating stage to enhance clarification of the potash brines.

Figure 2:
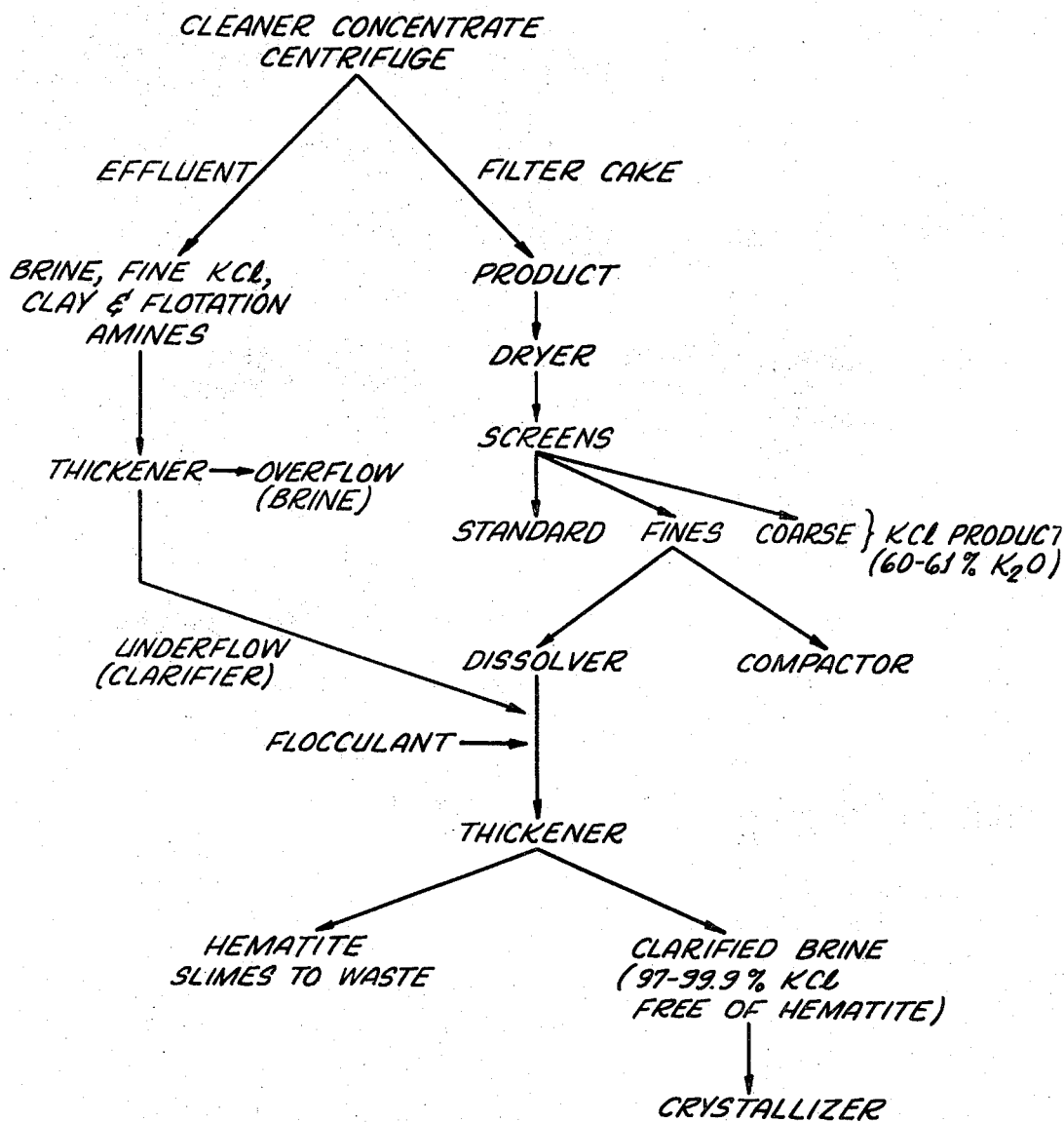

The inventive process and its advantages will become better understood by reference to the following more detailed description when considered in connection with the accompanying drawings wherein:

FIG. 1 is a schematic flow sheet of a suitable process for recovering potash from its ores; and FIG. 2 is a flow sheet showing recirculation of the effluent from the cleaner concentrate centrifuge into the system as a clarifier.

Referring now to FIG. 1, in a typical potash plant, —2 inch Allan ore removed from the underground is subjected to primary crushing to reduce its size to —4 mesh. Preparatory to flotation, the —4 mesh ore is pulped with mother liquor (brine) and the slurry is secondarily crushed to —6 or —8 mesh by passing the brine slurry of ore through a rod mill.

The slurry now passes through a series of cyclones, hydroseparators and is classified into three fractions. A slime slurry of —200 mesh particles contains most of the clay and shale insolubles. This slurry is thickened into a flocculated slime and is centrifuged before going to waste. Part of the flocculated slime can be redispersed by the action of a pump which transfers it to a later stage of the process. If redispersion is incomplete upon pumping, the nondispersed clay may be sheared in a colloid mill to a —200 mesh dispersion.

The second or fine fraction of the secondarily crushed slurry consists essentially of —20 to +200 mesh KCl and NaCl particles in a brine slurry with very little undispersed clay slimes remaining. Hematite is still closely associated with the KCl particles. Preliminary to flotation, this fraction is reagentized with a flotation collector reagent and possibly some starch to settle the remaining clay and decrease the demand for collector reagent.

The third or coarse fraction mainly includes —6 or —8 to +20 mesh KCl and NaCl particles in a brine slurry. The slurry is almost completely free of dispersed water insolubles, however, the hematite again remains closely associated with the KCl particles.

The coarse fraction is reagentized with a flotation collector reagent and possibly some oil and is combined with the reagentized second fraction. The combined particles are subjected to a first or rougher flotation which separates a rougher KCl flotation concentrate from the NaCl tailings which go to waste. The rougher flotation concentrate still contains some NaCl mechanically entrained in the concentrate and some unliberated KCl-NaCl aggregates. This NaCl is removed in a second or cleaner flotation cell.

The middlings from the cleaner flotation cell can be treated several ways. In one processing system the middlings are ground and returned to the rougher flotation, while the cleaner concentrate is centrifuged and then dried at 250° F. to 400° F. The dried concentrate of KCl particles still associated with hematite is classified on product screens dividing the material into coarse and standard market grade materials and into a fine (—48 or —65) mesh product. The fines have no direct market and are compacted into a coarse or standard grade product or can be further processed by solution crystallization into a much purer chemical grade product containing from 97 percent to 99.9 percent KCl.

Solution recrystallization of the fines takes place in a dissolver into which hot mother liquor at a temperature of about 200° F. to 220° F. is added and as the crystals of KCl are dissolved the hematite is released forming a uniform slurry of dispersed hematite in a hot KCl-NaCl equilibrium brine. The prior practice of removing hematite is to add a flocculant to the slurry before it flows to a thickener where hematite settles to the bottom and is sent to waste while the overflow brine is transported to the crystallizers. According to the invention, a clarifier is added to the hot slurry prior to flocculant addition and incomplete hematite settling and the attendant pink brines are prevented and the final potash crystals are free of hematite as evidenced by absence of ping coloration.

The clarifier added to the hot slurry may be the redispersed clay from the colloid mill or a $C_{14}^+$ primary alkylamine or a mixture of the clay and an alkylamine.

Cationic flotation reagents, such as primary fatty amines or salts of these amines, are the flavored flotation collector reagents since they permit good suspension and frothing and minimize caking during storage of the finished product. Sometimes the collecting power of the amines is enhanced by the addition of mineral oil and when substantial clay slimes are present during flotation, addition of starch to the flotation reagent mixer will flocculate the clay and decrease the apparent demand for the flotation reagent. The reagent is added in amounts of from about $1/10$ to 2 pounds per ton of salt solids.

The reagent selectively forms a coating on the potash particles and remains on the particles throughout the rougher and cleaner flotations, and is still present after the cleaner concentrate centrifugation. It has now been discovered that several of these reagents surprisingly act as clarifiers during the flocculation of the hematite slime.

For example, as shown in FIG. 2, the effluent from the cleaner concentrate centrifugation of FIG. 1, which comprises NaCl, fine KCl, primary clay slimes and the flotation agents may be thickened and recirculated into the dissolver as a clarifier. This material formerly has been centrifuged and returned to an earlier stage of the recovery system after thickening.

Thickening of the effluent is accomplished by permitting the solids to settle from the brine in a quiescent thickener zone. The overflow drawn from the upper portion of the zone is a brine which can be sent to the slime thickener of FIG. 1. The underflow is a thick slurry of primary clay slimes (fine clay dispersed in brine) and fine potash, both carrying reagents from the flotation process viz. $C_{14}^+$ alkylamine flotation reagents. Usually the underflow is from 35 to 45% by weight solids consisting of about 90 to 95% potash fines, some fine salts, about 5% by weight primary clay slimes and the balance essentially amine flotation reagents. This underflow, as shown in FIG. 2, is recirculated without further treating as a clarifier into the potash dissolver prior to addition of the flocculant. It has been found that best results are obtained when the underflow by-product is recirculated into the dissolver in sufficient amount to maintain the by-product up to about 15% by volume of the dissolver liquor. The most preferred amount of effluent underflow added is about 5 to 7% by volume. Some settling of the red hematite slimes is obtained by addition of even very small amounts of the effluent underflow but addition of more than 15 by volume is unecessary.

The retained flotation amines in the effluent underflow may comprise up to about .05% by weight of the total solids in the underflow. Preferably the amount of flotation amine when added with the effluent as a clarifier comprises from 1 to 5% by weight of the hematite in the dissolver solution. Additional alkyl amines can be added to the dissolver to make the total amine up to about 10% by weight of the hematite slimes but this has not generally been found to be necessary for adequate clarification with the dispersed clay present in the effluent underflow.

It has been found that a high purity, clear, potash brine free of the hematite slimes is obtainable by recirculating the thickened centrifuge effluent in this manner as a clarifier.

Investigations have further revealed that the flotation reagent is partially or totally destroyed during the processing of the concentrate between flotation and solution recrystallization so that to be effective the flotation agents must be added or recirculated into the dissolver.

The following experiments are offered by way of illustration and are not intended in any way to limit the inventive process. The experiments demonstrate that flotation reagent defficient concentrates produce colored brines; that brine solutions of high temperature dried concentrates are colored; and that amine preserved concentrates are colorless on solution recrystallization.

EXAMPLE 1

Flotation reagent removal from concentrate by heat

A potash flotation concentrate prepared from hematite containing ore as discussed above is prepared by the froth flotation in brine of a slurry of NaCl and KCl particles treated with about ½ to 2 pounds of "Armac T D" flotation reagent. The concentrate is removed from the flotation cells, centrifuged and dried at 180° C. 150 g. of dried concentrate is added with stirring to 900 ml. of equilibrium NaCl-KCl brine at 38° C. and heated to 95° C. A potash solution with a hematite slime suspension results. Shortly before 30 minutes, "Superfloc 16" flocculant on the basis of 0.03 lb. per ton of solids is added to the hot slurry and after stirring a few more minutes, the slurry is allowed to settle three to four hours while maintaining the temperature at 95° C. The slimes settled to a 10 percent solid content while the supernatant brine is faintly pink.

EXAMPLE 2

Flotation reagent removal with solvent

A centrifuged concentrate prepared as in Example 1(a) is dried under mild conditions and is then washed with $CCl_4$. The amine coating on the potash concentrate particles is dissolved and removed. The particles of the flotation concentrate are then added with stirring to 900 ml. of hot 95° C. equilibrium brine and flocculated as described above in Example 1(a) and the resultant brine is distinctly pink in color. Flocculation with equivalent amounts of guar or "Separan" flocculants or with double the amount of "Superfloc 16" is no more effective in settling the hematite slime.

EXAMPLE 3

Flotation reagent present 900 ml. of NaCl-KCl equilibrium brine is poured into a 1000 ml. graduated cylinder, the cylinder is placed in a liquid wax bath and the brine is heated to 95° C. An 150 g. portion of flotation concentrate, as prepared in Example 2 having the amine reagent removed by $CCl_4$, is added to the hot brine with stirring. After 20 minutes of stirring, "Armac T D" on the basis of 30 pounds per ton of hematite, is added to the brine. Stirring is continued for 10 minutes at which time "Superfloc 16" on the basis of 0.03 pound per ton of concentrate, is added with stirring. The slurry is maintained stationary at 95° C. for three to four hours, after which the hematite is completely settled on the bottom of the cylinder as a 10 percent solid layer and the supernatant brine is colorless.

"Armac T D" is a commercially available, highly hydrogenated, tallow amine acetate, a mixture of $C_{16}$ and $C_{18}$ alkylamines, mostly octadecylamine acetate. "Superfloc 16" is a high molecular weight polyacrylamide flocculant. "Separan NP10" or "Separan NP20" are water soluble, non-ionic high molecular weight polymers of acrylamide while Guar is a polysaccharide. The anionic polymeric acrylamide flocculants are preferred since they settle more quickly to a denser floc. It is apparent from the above three experiments that the flocculants are incapable of settling the hematite slime completely in the absence of an amine reagent.

However, in a continuous potash ore refining plant, it is only coincidental that a concentrate would reach the crystallizer unit with a sufficient clarifying amount of a flotation reagent. The ore composition is not steady and the volume of salt flowing through the processing unit varies as does the amount of flotation reagent and hematite reaching the crystallizer dissolving tank. The temperature of the concentrate in the fired rotary kiln dryer will vary with the amount of salt being dried and quite often the material in the dryer flashes above the vaporization or decomposition temperature of the amine.

Furthermore, not all of the amine flotation reagents are suitable clarifiers as will be illustrated below in the following table which also includes the results of the initial experiments. Examples 4–7 all follow the conditions of Example 3.

boxylic functional groups. The more these flocculants are anionic the greater their effectiveness is in removal of the hematite slimes from the brine. The degree to which the copolymer is anionic depends on the number of carboxylic functional groups available. These may be water soluble salts such as the sodium salts or the acids. Genfloc 156, a sodium salt of copolymer of 60% acrylamide and 40% acrylic acid, has given very good results. Other satisfactory anionic flocculants include Reten AM and Reten A-5 both of which are sodium salts of the polymerization products of acrylamide and acrylic acid. Reten AM contains 10–15% acrylic acid and Reten A–5 contains 50% acrylic acid. Other useful anionic flocculants include Separan AP-30 which contains about 28% acrylic acid and the balance acrylamide. Nalco 672, 673 and 675 have also been found to be satisfactory. Polysaccharides having carboxylic groups thereon such as the Guars are also usable as the flocculants of this invention.

Elimination of pink potash brines is also accomplished according to the invention by addition of a slurry of dispersed primary clay to the hot solution of potash concentrate before flocculation. The slurry should not be too dilute since this would upset the water balance of the crystallizer, dissolver and settler units and places a higher energy requirement on the crystallizer and would require equipment with substantially more capacity.

The primary clay produced in desliming the ore is excessively dilute. However, the density of the clay at the slimes thickener just before disposal as tails is about 10 to 15 percent clay solids. The clay is flocculated at this point but can be redispersed to a −200 mesh pulp by the shearing action of a colloid mill or a pump. The clay has no activity to clarify brines in the flocculated form as will be illustrated in the following examples.

TABLE 1

| Example | Flotation reagent | Clarifying kind | Agent amount lb./ton of hematite | Flocculating kind | Agent amount lb./ton of concentrate | Color of brine |
|---|---|---|---|---|---|---|
| 1 | Partially removed by drying at 356° F | None | | "Superfloc 16" | 0.03 | Faintly pink. |
| 2 | Removed with $CCl_4$ | do | | do | 0.03 | Pink. |
| 2a | do | do | | do | 0.06 | Do. |
| 2b | do | do | | Guar | 0.03 | Do. |
| 2c | do | do | | "Separan NP10" | 0.03 | Do. |
| 3 | do | "Armac T D" | 30 | "Superfloc 16" | 0.03 | Colorless. |
| 4 | do | do | 100 | Guar | 0.06 | Do. |
| 5 | do | Mixture of $C_{20}+C_{22}$ amine acetates | 50 | "Superfloc 16" | 0.03 | Do. |
| 6 | do | Octylamine acetate | 100 | do | 0.03 | Pink. |
| 7 | do | Dodecylamine acetate | 100 | do | 0.03 | Do. |

The amines that are effective clarifiers according to the invention are primary alkyl amines having at least 14 carbon atoms and advantageously not more than 30 carbon atoms and the amines preferably contain from 16 to 22 carbon atoms. The amines must be present in the brine solution of the concentrate in amounts of at least about 0.1 percent to 10 percent, preferably 1.0 to 5 percent, by weight on the basis of the hematite content. Advantageously, the amines are added as salts of organic or inorganic acids such as lower alkanoic acids or hydrochloric acid. They do not have to be added as salts, however, to be effective as clarifiers. It is only necessary that the amine cations be available for clarification. "Armac T D," which is essentially an acetate of octadecylamine and "Kemamine Acetate P 190," a mixture of arachidyl ($C_{20}$) and behenyl ($C_{22}$) amines, are very effective when present in the hot solution at a hematite clarifying level during flocculation of hematite.

The flocculants utilized in combination with the clarifiers of the invention can be selected from any of the well-known available materials, the choice being determined by speed of settling and rate and force of compaction.

It has been found that the most effective flocculants for separating the red hematite slimes are the anionic flocculants and specifically the copolymers of acrylamide and acrylic acid which are polyacrylamides having car-

EXAMPLE 8

Clarifying with flocculated clay 900 ml. of NaCl-KCl equilibrium brine is poured into a 1000 ml. graduated cylinder. The cylinder is placed in a liquid wax bath to heat the brine to 95° C. (206° F.). An 150 g. portion of flotation concentrate as prepared in Example 2 having the amine reagent removed by $CCl_4$, is added to the hot brine with stirring to form a potash brine solution having a hematite slime suspension and stirring is continued for twenty minutes. Flocculated clay is removed from the slimes thickener and in this case is a 12 percent slurry of clay slimes separated from Allan Canadian ore. The slurry is about an equal mixture of flocculated clay and shale particles. A portion of this slurry on the basis of 1.8 parts by weight to one part of hematite is added with stirring to the hot solution and stirring is continued for ten more minutes, at which time 0.03 pound of "Superfloc 16" per tone of concenrtate is added with stirring. The slurry is maintained stationary at 95° C. for 3–4 hours and the flocculant settles. The resultant brine is cloudy and pink.

EXAMPLE 9

Example 8 is repeated with the thickened Allan potash ore clay slimes redispersed to a −200 mesh dispersion by a colloid mill. The dispersion, at 12 percent solids, is added at 1.8 parts by weight to each part of hematite and on addition of the "Superfloc 16" flocculant, the solids settled faster to a flocculated layer of 16 percent solids. The supernatant brine is completely clear and colorless.

EXAMPLE 10

A —200 mesh dispersion of clay slimes removed from Carlsbad ore (mainly montmorillonite type clays) is added on the basis of 2.0 parts by weight of the clay to hematite following the procedure of Example 9. After addition of the flocculant, the settling rate is much slower and the settled solids contain only about 5 percent solids. The brine is completely clear and colorless.

Though the total water insolubles are increased by addition of clay, the amount of KCl containing brine is not increased with redispersed Canadian slimes, since the compaction rate and force is greater, the solids density being 16 percent by weight versus 10 percent without clay. In addition to forming the highest compacted beds, the redispersed clay is further preferred since it does not result in cloudy solutions and is a readily available waste by-product.

The clay is advantageously added in a minimum clarifying amount of from about 1.0 parts by weight of clay to each part of hematite. Amounts over four parts by weight of clay should be avoided to minimize the volume of the settled layer, and more efficient classification results when at least 1.5 parts of dispersed clay are utilized.

EXAMPLE 11

Clarifying with clay-amine effluent from cleaner concentrate centrifuge 40 tons per hour of potash dust and screen undersize were fed into a mother liquor of about 1500 gallons per minute in the dissolver. The dissolver solution was heated to 190 to 220° F.

About 50 to 100 gallons per minute of the "effluent thickener underflow" were added. This "effluent thickener underflow" consisted of about 40% solids comprising 90 to 95% fine potash, some fine salt, and about 5% primary clay slimes and flotation amines (octadecylamines).

A 0.05% solution of Genfloc 156 was then added to the dissolver at about 0.03 lb. per ton of dry feed. The flocculated mud settled fast and a clear brine was obtained. The brine was colorless and free of the hematite slimes.

In summary, the difficult to settle red hematite slimes released on solution of potash flotation concentrates are effectively and efficiently removed from the solution by maintaining a clarifying amount of a dispersed primary clay or of a $C_{14}$ to $C_{30}$, preferably $C_{16}$ to $C_{22}$, primary alkyl amine or of a mixture of clay and amine in the solution before flocculation. The hematite slimes are settled faster, compacted to thicker beds and a clear, colorless potash brine flows to the crystallizer. Exceptionally good results are obtained when an anionic flocculant is used after the clarifying step.

The process of the invention can be simply installed in existing potash plants, which can then be run considerably more economically since intermittent production of off-specification pink potash crystals is prevented and waste by-products can be utilized to prevent formation of such crystals.

It is to be understood that the foregoing only relates to a description of preferred embodiments of the invention and that considerable substitutions and alterations, as well as adaption to other types of flotation plants, are possible all without departure from the spirit and scope of the invention as set forth in the following claims.

I claim:

1. A method of producing a clear potash brine free of pink coloration contributed by hematite contamination from flotation concentrated hematite contaminated potash particles comprising:
   dissolving the particles to form a hot potash brine solution containing a hematite slime suspension;
   adding a clarifier selected from the group consisting of (a) from about 0.1 to 10 percent by weight on the basis of hematite of an alkyl amine containing at least 14 to about 30 carbon atoms, (b) at least about 1 part by weight for each part of hematite slime content of a dispersed montmorillonite-type clay, and (c) intermixtures of (a) and (b), to the hot solution, then adding a flocculant to the hot solution to settle the slime; and recovering a clear potash brine.

2. A method according to claim 1 in which from about 0.1 percent to 10 percent by weight on the basis of hematite of a primary alkyl amine containing at least 14 to about 30 carbon atoms is added as the slime clarifier.

3. A method according to claim 2 in which the amine is added as a salt.

4. A method according to claim 3 in which the amine contains from 16 to 22 carbon atoms and is added in amounts of about 1.0 to 5 percent by weight.

5. A method according to claim 1 in which 1.5 percent by weight of a clarifier consisting essentially of octadecylamine acetate is added as the clarifier.

6. A method according to claim 1 in which the flocculant is a material selected from the group consisting of polymers of acrylamide and polysaccharides.

7. A method according to claim 6 in which the flocculant is an anionic copolymer of acrylamide and acrylic acid.

8. A method according to claim 6 in which at least about 0.03 pound of a polymeric acrylamide flocculant per ton of solids is added to the hot solution.

9. A method according to claim 1 in which said clay has alkyl amines intermixed therewith prior to addition as a clarifier.

10. A method according to claim 1 in which a dispersion of —200 mesh clay montmorillonite-type is added as the clarifier.

11. A method according to claim 10 in which 1.5 to 4 parts by weight of clay montmorillonite-type in the form of a 10–15 percent by weight dispersion of —200 mesh particles is added for each part hematite slimes present.

12. A method according to claim 11 in which the clay dispersion is produced by shearing a flocculated clay montmorillonite-type slime.

13. A method according to claim 1 wherein a 10 to 15 percent by weight flocculated clay montmorillonite-type slime derived from a washed Canadian potash ore is redispersed by shearing to a —200 mesh pulp and is added to the hot potash brine in amounts of about 1.8 parts by weight of clay to each part of hematite.

14. A method of producing a clear potash brine free of pink coloration contributed by hematite contamination from potash flotation concentrates containing 1 to 5 pounds of hematite per ton of potash ore comprising:
   dissolving the potash flotation concentrate to form a KCl–NaCl equilibrium brine solution of the concentrate at a temperature of about 200° F. to 220° F., the hematite forming a slime;
   adding to said hot solution on a weight basis of hematite a clarifier selected from the group consisting of (a) 1 to 5 percent of a primary alkyl amine acetate, the alkyl of which contains 16–22 carbon atoms, (b) 1.5 to 4 parts for each part of hematite slime of a —200 mesh dispersion of montmorillonite type clay and (c) intermixtures of (a) and (b);
   adding at least 0.03 pound per ton of concentrate of a flocculant selected from the group consisting of polyacrylamides and polysaccharides to said hot solution; settling the hematite, clarifier, and flocculant; and recovering a colorless clear potash brine.

15. A method as defined in claim 14 wherein said flocculant is anionic.

16. In a process for the refining of potash ores including at least two flotation steps one of said flotation steps being a rougher flotation and the other of said flotation steps being a cleaner flotation and the steps of centrifuging the cleaner flotation concentrate to obtain an effluent comprising flotation reagents, clay slimes, potash and brine and a filter cake comprising potash concentrate and hematite; drying the filter cake; screening the filter cake; dissolving the fines in a hot mother liquor to form a hot potash-brine solution with colored hematite slimes therein, the improvement comprising the steps of:

thickening said effluent to form an underflow slurry of clay and potash having flotation reagents therein;

adding a clarifying amount of said underflow slurry containing at least about 1 part by weight of montmorillonite type clay for each part of hematite slime content to said hot solution;

settling said slimes by adding a flocculant to said hot solution; and recovering a clear potash brine free of said hematite slimes.

17. A process as defined in claim 16 wherein said underflow comprises by weight from about 35 to 45% solids consisting essentially of about 90–95% by weight potash fines, about 5% by weight primary clay slimes, and the balance essentially amine flotation reagents.

18. A process as defined in claim 16 wherein said flocculant is anionic.

19. A process as defined in claim 16 wherein said flocculant is an anionic polyacrylamide having carboxylic functional groups thereon.

20. A process as defined in claim 16 wherein the amount of underflow added to said hot solution comprises up to 15% by volume of said hot solution.

21. A process as defined in claim 16 wherein said underflow is added to said hot solution in sufficient amount to make the total alkylamine content in said solution from about 1 to 5% by weight of the hematite in said solution.

References Cited
UNITED STATES PATENTS

| | | | |
|---|---|---|---|
| 2,672,236 | 3/1954 | Weinig | 209—166 |
| 2,695,100 | 11/1954 | Barr | 209—166 |
| 2,696,912 | 12/1954 | Atwood | 209—166 |
| 2,766,885 | 10/1956 | Marullo | 23—312 X |
| 2,923,408 | 2/1960 | Williams | 209—166 |
| 3,008,655 | 11/1961 | Adams | 23—312 X |
| 3,095,282 | 6/1963 | Wilson | 23—312 |
| 3,165,465 | 1/1965 | Ray | 209—5 X |
| 3,259,237 | 7/1966 | Schoeld | 209—166 X |
| 3,406,114 | 10/1968 | Goren | 209—5 X |
| 3,438,745 | 4/1969 | Smith | 23—312 |

NORMAN YUDKOFF, Primary Examiner

S. J. EMERY, Assistant Examiner

U.S. Cl. X.R.

23—89; 209—5, 166; 210—53, 54

PO-1050
(5/69)

UNITED STATES PATENT OFFICE
CERTIFICATE OF CORRECTION

Patent No. 3,545,941                     Dated December 8, 1970

Inventor(s) Martin Wilson

It is certified that error appears in the above-identified patent and that said Letters Patent are hereby corrected as shown below:

| | |
|---|---|
| Col. 2, line 9 | "benefication" should be --beneficiati |
| Col. 3, line 30 | "ping" should be --pink-- |
| Col. 8, line 38 | "clay" should be deleted before "montmorillonite" and inserted after "type" |
| Col. 8, line 41 | "clay" should be deleted before "montmorillonite" and inserted after "type" |
| Col. 8, line 45 | "clay" should be deleted before "montmorillonite" and inserted after "type" |
| Col. 8, line 48 | "clay" should be deleted before "montmorillonite" and inserted after "type" |
| Col. 9, line 11 | after "slurry" and before "of" the following should have been inserted --containing at least about 1 part by weight of montmorillonite type clay for each part of hematite slime content-- |

Signed and sealed this 20th day of July 1971.

(SEAL)
Attest:

EDWARD M. FLETCHER, JR.
Attesting Officer

WILLIAM E. SCHUYLER, JR.
Commissioner of Patents